(12) United States Patent
Vespasien

(10) Patent No.: US 10,144,432 B2
(45) Date of Patent: Dec. 4, 2018

(54) METHOD FOR CONTROLLING THE CLAW COUPLING OF A GEARBOX

(71) Applicant: RENAULT s.a.s., Boulogne-Billancourt (FR)

(72) Inventor: Jean-Marie Vespasien, Choisy-le-Roi (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 519 days.

(21) Appl. No.: 14/785,169

(22) PCT Filed: Mar. 13, 2014

(86) PCT No.: PCT/FR2014/050574
§ 371 (c)(1),
(2) Date: Oct. 27, 2015

(87) PCT Pub. No.: WO2014/170565
PCT Pub. Date: Oct. 23, 2014

(65) Prior Publication Data
US 2016/0075337 A1    Mar. 17, 2016

(30) Foreign Application Priority Data

Apr. 17, 2013 (FR) .................................... 13 53479

(51) Int. Cl.
*B60W 30/19* (2012.01)
*F16H 61/04* (2006.01)
(Continued)

(52) U.S. Cl.
CPC ............. *B60W 30/19* (2013.01); *B60W 10/04* (2013.01); *B60W 10/08* (2013.01); *B60W 10/11* (2013.01);
(Continued)

(58) Field of Classification Search
CPC .......... F16H 2059/462; F16H 61/0403; B60W 10/08
See application file for complete search history.

(56) References Cited

U.S. PATENT DOCUMENTS 6,123,642 A    9/2000 Saito et al.
2008/0314176 A1    12/2008 Krieger et al.

FOREIGN PATENT DOCUMENTS

DE    195 30 233 A1    2/1997
DE    10 2006 003 715 A1    8/2007
(Continued)

OTHER PUBLICATIONS

International Search Report dated May 16, 2014 in PCT/FR14/050574 Filed Mar. 13, 2014.
(Continued)

*Primary Examiner* — Derek D Knight
(74) *Attorney, Agent, or Firm* — Oblon, McClelland, Maier & Neustadt, L.L.P.

(57) ABSTRACT

Method for controlling the claw coupling of two gearbox elements initially rotating at different speeds when the driver or the box computer requests claw coupling, characterized in that, in a first phase, the difference in rotational speed of the rotary elements is brought by a regulator to a non-zero reference value without any translational movement of the rotary elements toward one another, and in that the movement of the rotary elements until they are claw-coupled occurs in a second phase that begins when the difference in rotational speed reaches its desired value, during which phase the difference perceived by the regulator is modulated by a factor (F) that is a function of the raw difference between the measured value and the reference value.

9 Claims, 4 Drawing Sheets

(51) Int. Cl.
*B60W 10/04* (2006.01)
*B60W 10/08* (2006.01)
*B60W 10/11* (2012.01)
*F16H 59/46* (2006.01)

(52) U.S. Cl.
CPC ......... *F16H 59/46* (2013.01); *F16H 61/0403* (2013.01); *B60W 2710/081* (2013.01); *B60W 2710/09* (2013.01); *F16H 2059/462* (2013.01); *F16H 2061/0422* (2013.01); *F16H 2061/0474* (2013.01)

(56) References Cited

FOREIGN PATENT DOCUMENTS

| | | |
|---|---|---|
| EP | 0 928 715 A2 | 7/1999 |
| FR | 2 933 247 A1 | 1/2010 |
| WO | 2012/131259 A1 | 10/2012 |

OTHER PUBLICATIONS

French Search Report dated Jan. 23, 2014 in French Application No. 1353479 Filed Apr. 17, 2013.

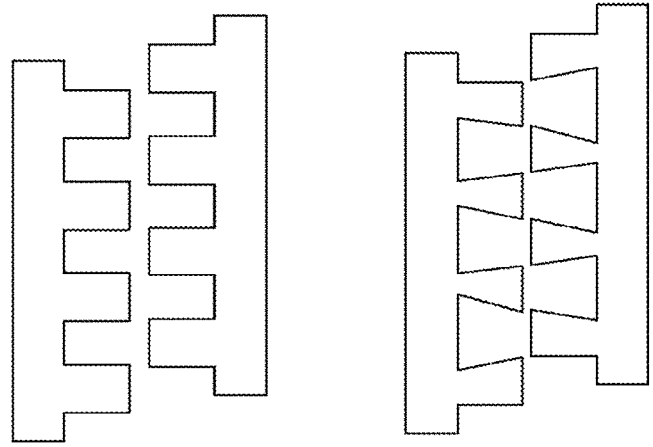
Fig. 2A  Fig. 2B
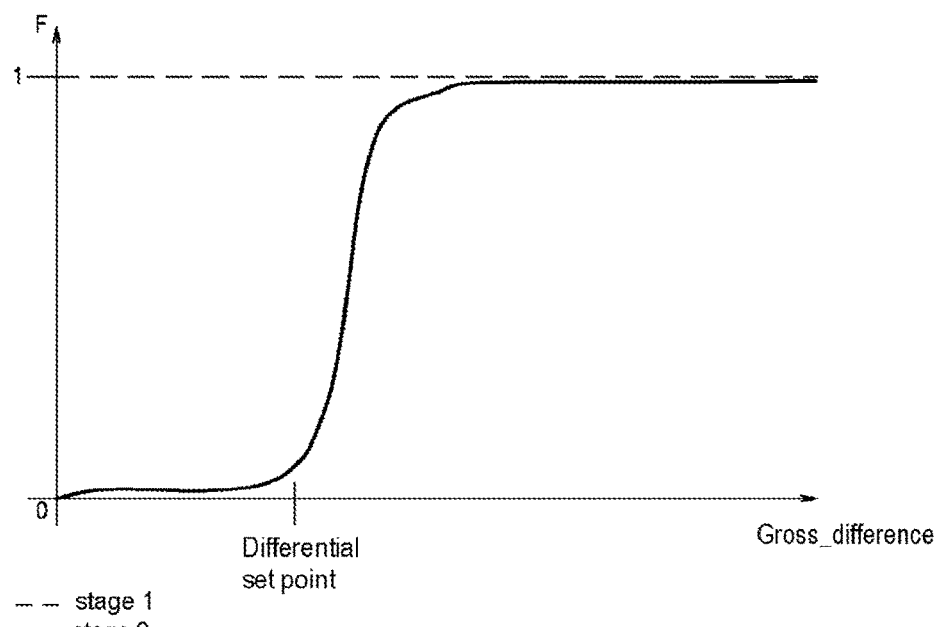
Fig. 3

METHOD FOR CONTROLLING THE CLAW COUPLING OF A GEARBOX

BACKGROUND

The present invention relates to the field of motor vehicle transmissions.

It relates to the control of the claw coupling of a gearbox during gear changes requiring the mastery of the speed differential between the gearbox elements to be claw-coupled, in the absence of a friction mechanical synchronization system.

The object of this invention is a method for controlling the claw coupling of a vehicle gearbox.

It is preferably used on, but not limited to, a hybrid transmission for a motor vehicle provided with a heat engine and a drive electric machine including two concentric primary shafts each bearing at least one reduction gear on a secondary shaft connected to the vehicle wheels, such as described in the publication WO2012/131259.

This transmission, illustrated by FIG. 1, includes a solid primary shaft 1 connected directly by means of a filtration system (damper hub, "damper", double flywheel or other element) 2, to the inertia flywheel 3 of a heat engine (not shown). The solid shaft 1 bears an idler gear 4 which can be connected therewith by a first coupling system 5 (claw, synchronizer, or other type of optionally progressive coupler). A hollow primary shaft 6 is connected to the rotor of an electric machine 7.

The hollow shaft 6 bears two fixed gears 8, 9. It can be connected to the solid primary shaft 1 by means of the coupling system 5, with or without a mechanical synchronizer. A secondary shaft 10 bears two idler gears 11 and 12. The idler gears 11, 12 can be connected to the primary shaft by means of a second coupling system 13, with or without a mechanical synchronizer. The secondary shaft 10 also bears a fixed gear 14 and a reduction gear 15 toward a differential connected with the wheels (not shown) of the vehicle.

The first coupling means 5 can occupy at least three positions, wherein:
- the heat engine is decoupled from the drive train connecting the electric machine 7 to the wheels,
- the heat engine drives the wheels with or without the assistance of the electric machine, and
- the heat engine and the electric machine 7 are coupled such as to add up the respective torques thereof in the direction of the wheels.

The second coupling means 13 also has three positions, wherein it is in a neutral position, or either one of the two idler gears 11, 12 are claw-coupled on the secondary shaft 10.

When no mechanical synchronization means is provided on the coupling systems 5 and 13, the passage from one kinematic mode to the other requires the electronic control of the synchronization of the elements to be claw-coupled. The design of the teeth located on the coupling systems 5 and 13 can require mastery of a certain speed differential between the elements to be claw-coupled, in order to provide the coupling. It is the task then of a computer to control this speed differential.

The teeth of the elements to be claw-coupled can have various shapes. When they are straight (rectangular) as in FIG. 2A, or with "anti-releases", as in FIG. 2B, the tooth-to-tooth contact surface is considerable. If the two parts are exactly at the same speed, there is a risk of tooth-to-tooth abutment, and therefore of unsuccessful claw coupling. It is then necessary to keep a certain difference in speed between the elements to be claw-coupled, such that they find relative positions allowing claw coupling.

Once this speed differential has been established, the order for claw coupling (or for coupling) can be given, in order to translate the coupling system.

The technical problem to be solved in order to perfect the coupling operation is then the following: maintaining the speed differential up to the claw coupling moment, at the risk of failure, while at the very instant of the claw coupling, the mechanics cause synchronism of the coupled parts (i.e. a zero speed differential).

BRIEF SUMMARY

The aim of the present invention is to solve the contradiction existing at the moment of claw coupling, between the necessity to maintain a speed differential, and the mechanical requirement for canceling this same differential.

To this end, it proposes a two-stage operation. In a first stage, the difference in speed of the rotary elements is brought by a regulator to a non-zero set point value without translating the rotary elements toward one another. In a second stage, that begins when the difference in speed reaches the desired value thereof, the difference seen by the regulator is modulated by a factor (F), which is a function of the gross difference between the measured value and the set point value. The rotary elements are translated toward one another. This movement continues until the end of claw coupling.

Preferably, the factor (F) is set at the value 1 during the first stage, then defined by a table of values which is a function of the gross difference between the measured value and a set point value during the second stage.

BRIEF DESCRIPTION OF THE DRAWINGS

The invention will be better understood upon reading the following description of a nonlimiting embodiment thereof, with reference to the appended drawings, wherein:

FIGS. 2A and 2B show two types of claws,

FIG. 3 illustrates the calculation of the modulating factor for the gross difference according to the stages of the operation, FIG. 4 summarizes the strategy of the invention.

DETAILED DESCRIPTION

Figure 1:
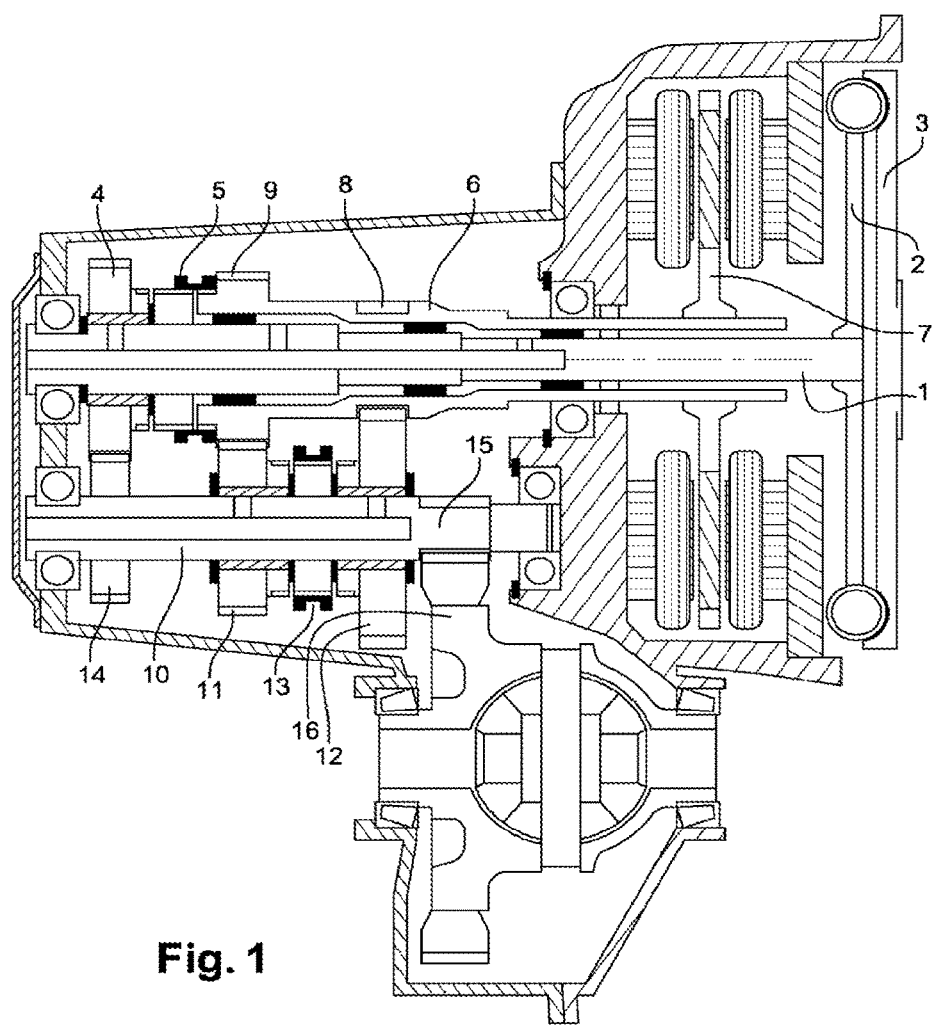
FIG. 1 is a gearbox architecture diagram.
Figure 4:
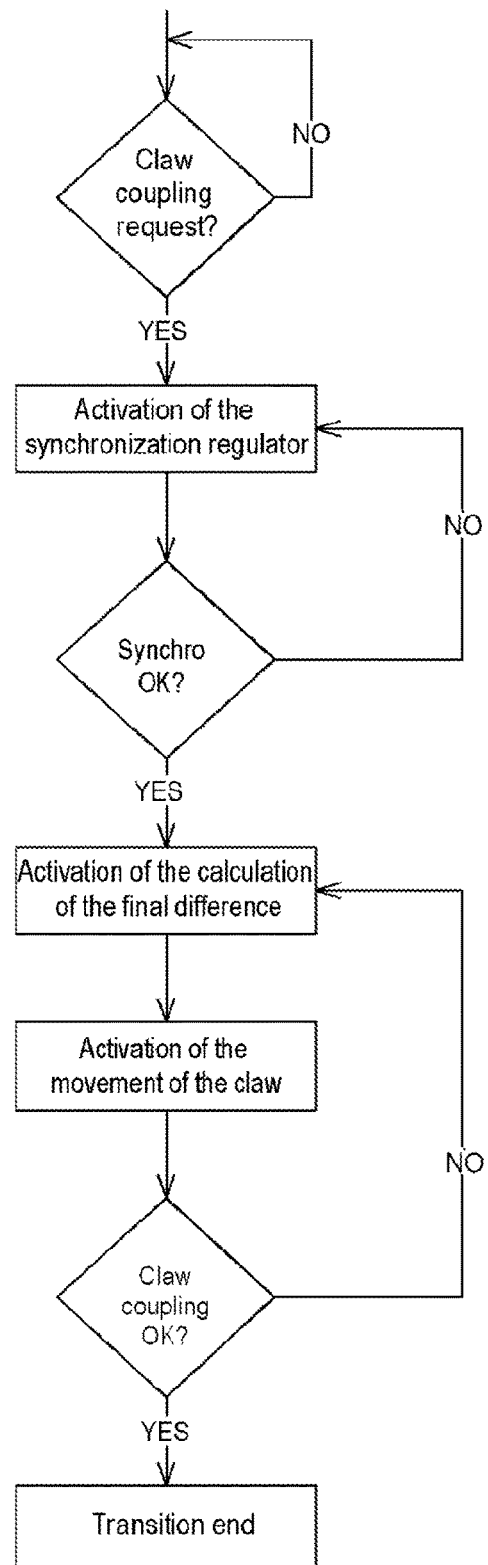

The strategy illustrated by FIG. 4 is as follows. Following a claw coupling request by the driver, or by the computer of the transmission, a synchronization regulator is activated. This regulator is installed in the computer of the transmission or of the powertrain. It controls the driving power sources of the vehicle, i.e. the electric machine and/or heat engine, in order to establish a difference in speed between the two rotary elements. This difference, or set point differential, between a speed value measured on one of the rotary elements and a set point speed, has a non-zero value. As indicated above, this differential is determined in order to facilitate claw coupling in the absence of a mechanical synchronization unit.

Figure 5:
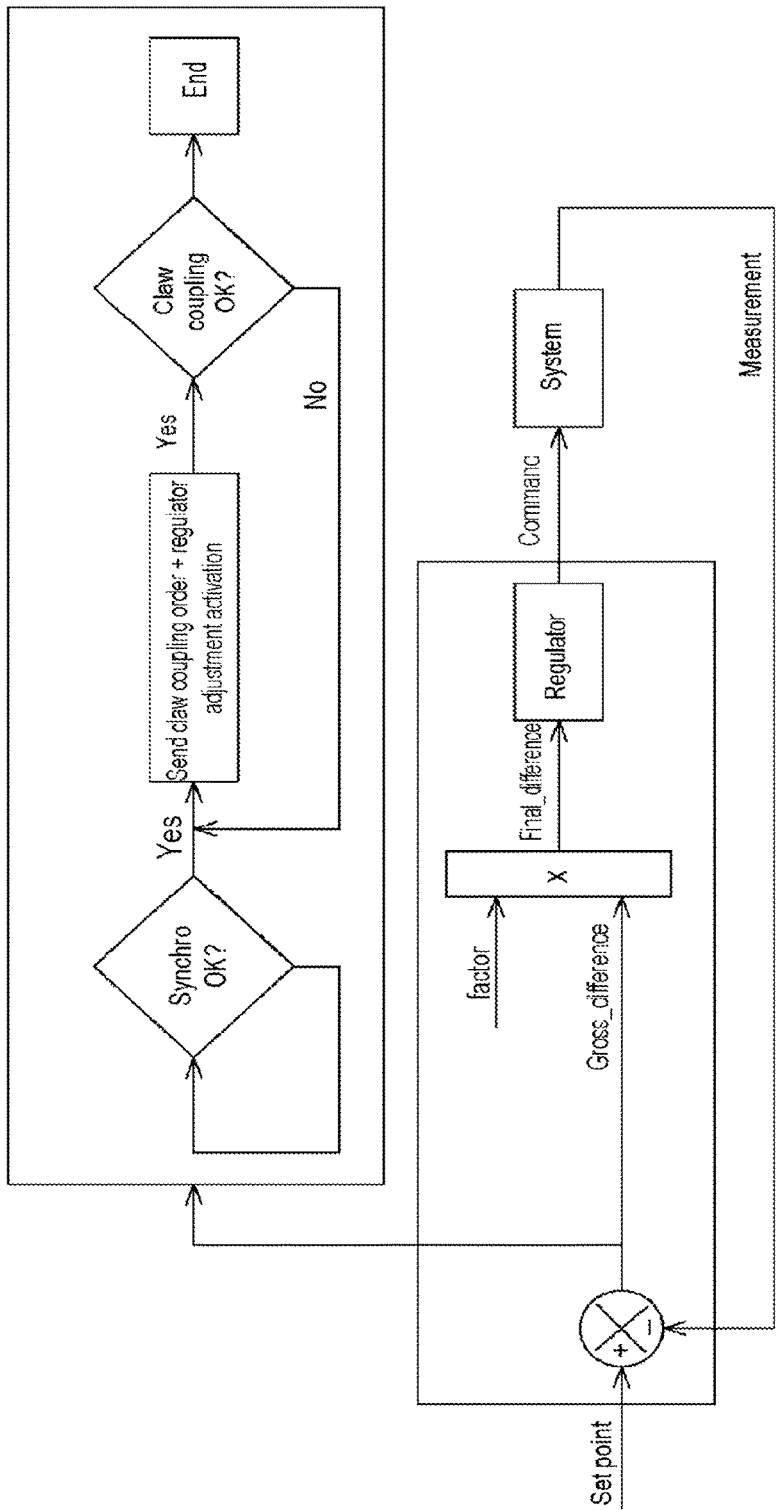
FIG. 5 shows the associated regulation loop.

From the claw coupling request, which involves the activation of the regulator of FIG. 5, the latter imposes on the "system" (actuators of the power sources) a "command", suitable for establishing the "final difference" in speeds which is mentioned in FIGS. 4 and 5. During a first stage of the operation, called an initial synchronization stage, the "final difference" is maintained on the gross value thereof. This stage allows the desired speed differential to be established between the two elements to be claw-coupled. At the end of this first stage, i.e. at the step entitled "synchro OK" in FIG. 5, the second stage of the operation, or claw coupling stage, commences. The calculation of the final difference is then adjusted within the regulator, such as to maintain the desired speed differential until claw coupling, without overreacting, i.e. without causing shocks. This adjustment is the result of introducing a modulating factor F in the regulation loop. At the same time, the movement of a rotary element, such as a claw having straight or rectangular teeth (FIG. 2A), or with an "anti-release" (FIG. 2B), starts.

The closed loop regulation of FIG. 5 is of the self-adjusting type. The control method is based on a self-adjusting closed loop regulation of the difference in speeds between the rotary elements, broken down into two stages. During the first stage, the difference in speed of the rotary elements is brought by a regulator to a non-zero set point value, without translating the rotary elements toward one another. The movement of the rotary elements up to the claw coupling occurs in the second stage, which begins when the difference in speed reaches the desired value thereof. The difference seen by the regulator is then modulated by a factor (F), which is a function of the gross difference between the measured value and the set point value.

During the synchronization stage, the regulator receives, as input, the "final difference", which is strictly equal to the "gross difference" (gap between the set point and the measurement). During the claw coupling stage, the calculation thereof is adjusted, by multiplying "the gross difference" by the factor F, the variation of which is illustrated by FIG. 3:

this factor is set at the value 1, during a first stage, called an initial synchronization stage, it is defined by a table of values which is a function of the gross difference from a second claw coupling stage.

The variation in the factor F is triggered in the "checking" block of FIG. 5, at the "regulator adjustment activation" step of FIG. 4. The speed differential has then reached the desired value in order to trigger claw coupling ("synchro OK"). The claw coupling stage is then launched during which the factor F modulates the difference seen by the closed loop regulator, while the claw is translated. The adjustment continues until claw coupling is complete. At this moment ("claw coupling OK"), the kinematic mode change is ended. During the claw coupling stage, the gross difference is, therefore, multiplied by the modulating factor (F), and this modulation continues while the claw coupling of the rotary elements has not been completed.

During the claw coupling stage, the coefficient simultaneously allows:

the speed synchronization to be maintained up to the claw coupling moment, any exaggerated compensation for the sudden cancelation of the speed differential, caused by the mechanics, to be prevented, and any possible synchronization disturbance to be effectively offset.

In summary, the proposed regulator allows:

rapid and robust synchronization of the element to be claw-coupled to be guaranteed, by controlling the speed differential required for the claw coupling during the first stage of the operation, then this differential to be maintained up to claw coupling, without overreacting, i.e. without causing shocks, during the second stage of the operation, i.e. at the very moment of claw coupling.

As indicated above, the invention is preferably used on a hybrid transmission for a motor vehicle provided with a heat engine and a drive electric machine. In this case, the regulator delivers a command signal to the actuators of either of the two sources of power introduced into the gearbox, i.e. the heat engine and electric machine. Therefore, the regulator can control the speed of an electric machine for input of power into the transmission, and/or that of a heat engine.

The invention claimed is:

1. A method for controlling claw coupling of two gearbox elements initially rotating at different speeds when a driver or a gearbox computer requests claw coupling, comprising:

controlling the claw coupling in a first stage, during which a difference in speed of the two gearbox elements is brought by a regulator to a set point value that is not zero without translating the two gearbox elements toward one another, controlling the claw coupling in a second stage that begins when the difference in speed reaches the set point value, the second stage including translating the two gearbox elements toward each another for the claw coupling, and during the translating the two gearbox elements towards one another, the difference in speed is received by the regulator and is modulated by a factor (F), which is a function of a gross difference between a measured value of the difference in speed and the set point value, wherein the regulator outputs a command to control the speed of the two gearbox elements.

2. The control method as claimed in claim 1, wherein the factor (F) is set at a value of 1 during the first stage, then defined by a table of values which is a function of the gross difference between the measured value and the set point value during the second stage.

3. The control method as claimed in claim 1, wherein the controlling the claw coupling in the first stage and the controlling the claw coupling in the second stage is based on a self-adjusting closed loop regulation of the difference in speed between the two gearbox elements.

4. The control method as claimed in claim 3, wherein, during the first stage, the regulator receives, as input, a signal for speed gross difference, equal to a gap between the set point value and the measured value.

5. The control method as claimed in claim 4, wherein during the second stage, the gross difference is multiplied by the factor (F).

6. The control method as claimed in claim 1, wherein the modulation of the difference seen by the regulator continues while the claw coupling of the two gearbox elements is not completed.

7. The control method as claimed in claim 1, wherein the regulator delivers a command signal to actuators of sources of power introduced into the gearbox.

8. The command method as claimed in claim 7, wherein the regulator controls a speed of an electric machine for input of power into a transmission.

9. The command method as claimed in claim 7, wherein the regulator controls a speed of a heat engine for input of power into a transmission.

* * * * *